Sept. 1, 1925.

F. W. MANNING 1,552,072

METHOD OF TREATING OIL

Filed June 16, 1922

INVENTOR.

Fred W. Manning

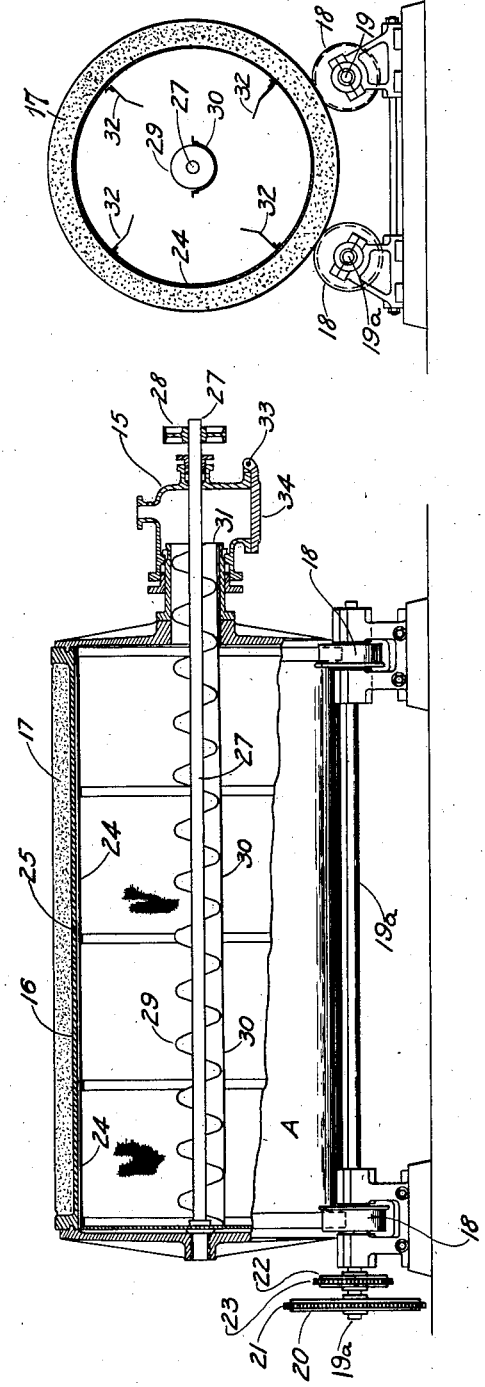

Patented Sept. 1, 1925.

1,552,072

UNITED STATES PATENT OFFICE.

FRED W. MANNING, OF NEW YORK, N. Y., ASSIGNOR TO MANNING REFINING EQUIPMENT CORPORATION, A CORPORATION OF DELAWARE.

METHOD OF TREATING OIL.

Application filed June 16, 1922. Serial No. 568,789.

*To all whom it may concern:*

Be it known that I, FRED W. MANNING, a citizen of the United States, residing in the city and county of New York, State of New York, have invented certain new and useful Improvements in Methods of Treating Oil, of which the following is a specification.

My invention relates to the treatment of hydrocarbon oils, and particularly petroleum and its products, shale oils or other mineral oils and their products, for effecting purification or other desired improvements in their characteristics, and particularly for decolorizing them or removing from them color-imparting materials.

It is the object of my invention to provide a method of and apparatus for treating oils, whereby there are effected substantial gains or improvements in efficiency and speed of operation and whereby there is effected a substantial saving in and reduction of cost and size of apparatus and in increase in plant capacity.

It is further an object of my invention to provide a method and apparatus for effecting substantially uniform clarification of an oil to any desired color by a decolorizing agent whose quantity is materially less as compared with prior practice.

I accomplish these objects by a method and apparatus similar in a broad sense to that disclosed in my Patent Number 1,504,772, dated August 12, 1924, my present invention comprising various improvements thereover.

In accordance with my invention, the oil is brought into intimate and uniform contact, as by agitation, with a relatively large quantity of finely divided or pulverulent decolorizing or other material, as fuller's earth, or equivalent, the oil preferably being first heated to a desired temperature and the earth thereafter mixed with the oil under superatmospheric pressure.

Further in accordance with my invention, the mixture of oil and decolorizing or other material is then separated by filtration, as in a rotary filter, under high pressure, the decolorizing or other material remaining in the filter, preferably continuing in rotation and preferably continuing under pressure while subjected to a solvent oil or equivalent for removing the soakage oil; and preferably thereafter, while continuing in rotation and under pressure, the decolorizing or other material is subjected to superheated steam for the purpose of removing the solvent oil or equivalent.

In prevalent methods of decolorizing or purifying oil, particularly petroleum, coarse fuller's earth, such as will pass through sieves having 30 to 60 meshes per inch and accordingly styled 30 to 60 mesh earth, is charged into a filter or percolator tank to great depth, as for example, 15 to 20 feet, and the oil percolated or filtered therethrough by gravity at atmospheric pressure, or at most, a relatively low super-atmospheric pressure. The soakage oil remaining in the earth is to some extent removed by application of air therethrough, and more completely removed by application of naphtha or other solvent, the naphtha thereafter being removed by application of steam. In these methods the rate of filtration or decolorization is slow; there is a tendency of the earth to channel, permitting unfiltered or untreated oil to become mixed with filtered or decolorized oil, and requiring increased amounts of wash naphtha; the yield of filtrate oil of desired quality is low per pound of earth used, due in part to the tendency of the unfiltered or untreated oil to pass through the filter medium in the passages between the coarse grains instead of through them; there occurs fractional filtration in the sense that for a given quantity of unfiltered or untreated oil charged into the filter only a limited quantity of a given desired grade of filtrate is obtainable, the oil emerging from the filter becoming, as filtration proceeds, more and more like the unfiltered stock delivered to the filter; there is required a great amount of wash naphtha, sometimes as much as from three to five times the weight of the earth or clay washed, particularly when the earth is used for decolorizing the heavier or more viscous oils, such as cylinder stock; and there is great loss of naphtha during washing and redistillation of the naphtha, the loss in some cases reaching eight or ten gallons per ton of earth or clay washed.

In accordance with my invention, however, disadvantages of the old methods of the character above referred to are overcome by mixing with the oil, fine fuller's earth or equivalent whose weight is from about 10 per cent to about 50 per cent or more of the weight of the oil, light oils ordinarily requiring the low percentages of earth and the heavier oils the greater percentages, except in those cases where little color is to be removed, in which case the percentages of earth may be smaller.

The fuller's earth or equivalent is of fine mesh, as 100 mesh to 200 mesh, or higher, though where suitably high pressures are employed during mixing and filtration, the earth may be from about 60 to about 100 mesh. Fine mesh clay or earth of the character referred to exposes so large an amount of surface of collodial siliceous matter to act upon or adsorb the coloring matter of the oil that the total decolorizing value of the earth or clay for all its successive uses is of the order of one and one-half to three times that of coarse earth or clay as used in the usual way. The degree of decolorization or the comparative decolorizing value of the earth or clay depends principally upon the kind or nature of the oil, the fineness of subdivision and the extent of dehydration of the clay or earth, and in the case of the coarser earth, upon the extent of time of its contact with the oil, and the pressure employed.

Both the mixing of the oil and earth and filtration are advantageously effected under pressure ranging from about 50 pounds to 150 pounds per square inch, depending upon conditions or circumstances. With clay or earth of 100 mesh and finer, decolorization of the oil, including heavy cylinder stock, takes place almost immediately the earth and oil come into contact and pressure is not essential, but high pressures, as from 50 to 150 pounds per square inch, are desirable during the periods of filtration, airing, naphtha washing and steaming, in order to obtain speed, to keep the soakage or oil retention normal, as from about 50 to 70 per cent of the weight of clay or earth used, and to thoroughly wash out the oil soakage and to steam the naphtha wash from the earth or clay. Where relatively coarser earth, as 60 to 100 mesh, is employed the mixing of oil with clay as well as their separation by filtration is advantageously under a pressure of the order of 50 to 150 pounds per square inch.

In general, it will be understood that the pressure, particularly during filtration, will be the higher with the heavier oils and may be lower with lighter oils.

It should furthermore be stated that the plastic character of certain earths and clays make the use of saturated steam impossible. The nature of this type of earth is such that it has a tendency to slime when in contact with moisture. My invention contemplates the use of superheated steam for removing oil or naphtha wash or revivifying agent from such earth. I have found that this dry superheated steam very readily penetrates the earth and displaces oil or other liquid without any of the difficulties encountered with wet saturated steam.

While I have referred to fuller's earth or clay as the decolorizing or purifying medium, it will be understood that when suitable or desirable other materials may be used, as for example, bone black, or char, kieselguhr or other diatomacious earth, mineral or vegetable carbon, such as derived from rice hulls, sawdust, coal, peat, lignite, etc. The fuller's earth or any equivalent material is ground or pulverized to or exists in the mesh sizes above described. It will be understood further that of all the materials referred to, any may be used singly, or one or more of them may be employed in mixture with each other.

When employing fuller's earth, which may be of any of the various or suitable characters found, for example, in Florida, Death Valley, California, and other places, it is advantageous to use the fine mesh earth occurring at the mills or mines as by-product when grinding the clay or earth for production of coarse sizes. The earth or clay, particularly when of the character found in Florida, may be reduced to suitable mesh sizes described and then after driving off moisture therefrom, used in contact with oil and then rejuvenated or revived, as by roasting or calcining, and again used upon oil. With respect to earth or clay, such as found in Death Valley, California, and other places, it may be first subjected to special treatment, as by acid, electrolysis, etc., to put it in condition for decolorizing or purifying oil. It will be understood, however, that my invention comprehends the use of any type of fuller's earth or clay requiring or receiving preliminary or special treatment, or not.

While naphtha is ordinarily utilized for removing soakage oil from the clay or earth, it will be understood that any other solvent or equivalent may be employed, and for extracting and removing coloring matter from the earth or for otherwise improving it, dilute mineral acid, benzol, acetone, alcohol, or a mixture of them, or any other suitable solvent or diluent, may be passed through the earth.

For an understanding of my method and for an illustration of one of the various forms my apparatus may take, reference is to be had to the accompanying drawings, in which:

Fig. 2 is a side elevational view, partly in section, of rotary filter structure.

Fig. 3 is an end view of the same, partly in section.

Figure 1:
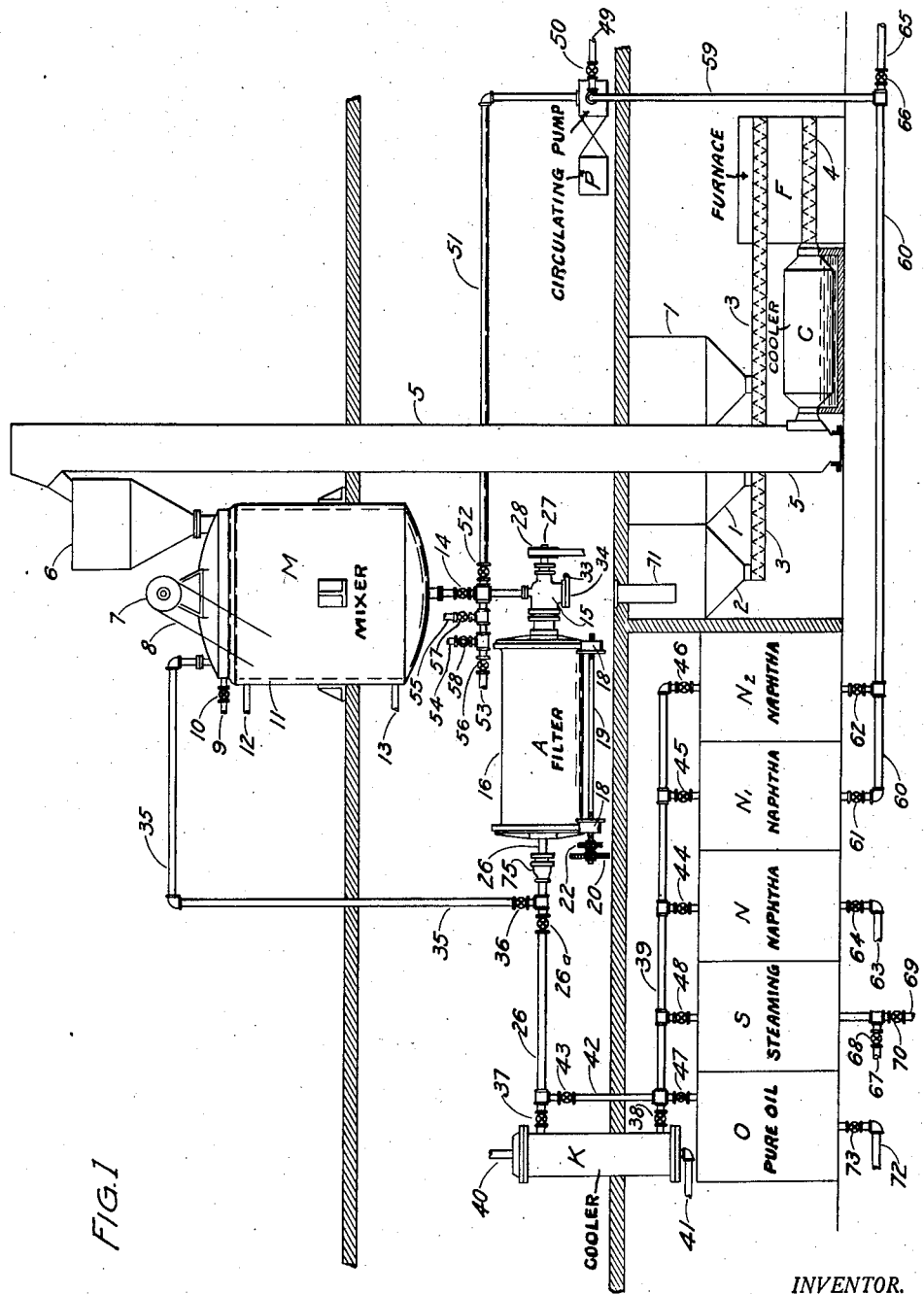
Fig. 1 is an elevational view of an apparatus or system embodying my invention.

Referring to the drawings, 1, 1 are bins or receptacles in which are stored new or fresh fine mesh clay, while 2 is a bin or receptacle for storing the fine mesh clay which has been used in the process until requiring revivification or other treatment. Conveyor structure 3 serves to convey clay from any of the bins 1, 2 to the furnace F, of character or structure suitable for burning, roasting or calcining of the fuller's earth or other material with a negligible dust loss. The clay is subjected to suitable temperature in the furnace F, new or fresh clay to a temperature suitable for driving off moisture therefrom and used clay to a temperature suitable for its regeneration or revivification. Temperatures of from 700 degrees to 1300 degrees F., more or less, may be employed in the furnace F, generally, however, a temperature of about 900 degrees being suitable. By conveyor or other suitable structure 4 the clay is delivered from the furnace F to the rotary or other suitable cooler C in which the temperature of the clay is to suitable extent reduced. The extent of temperature reduction may be anything suitable or desirable, as for example, to ordinary room temperature, but generally, and particularly for the heavier oils, to a temperature which will ensure a temperature of the order of 250 degrees F. when the clay comes in contact with the oil in the mixing tank M hereinafter referred to.

The earth or clay is delivered from the cooler C to the elevator or conveyor 5, which delivers it into the weighing or measuring hopper of structure 6, from which quantities of earth or clay of known weight are delivered into the mixing chamber or tank M in which is disposed any suitable type of agitating structure, such as rotary paddles or the like driven, for example, by pulley 7 driven by belt 8 from any suitable source of power.

Communicating with the interior of the mixing tank M is a pipe 9, controlled by valve 10, through which is delivered any suitable fluid, as air, under suitably high pressure, as for example, from 50 to 150 pounds per square inch, whereby the mixture of earth with oil may be effected under pressure. The mixing tank is preferably provided with a surrounding steam jacket 11, to which steam is delivered, as by pipe 12, and discharged at lower temperature or in the form of condensate through the pipe 13. The steam jacket affords means for effecting the contact of earth with the oil at suitably high temperature, temperatures above the ordinary or atmospheric temperatures being preferred for heavy oils, as cylinder stock, it being understood, however, that for lighter oils the temperature may be lower or may be ordinary temperatures of the atmosphere.

Through suitable pipe connection controlled by valve 14 the mixing tank M communicates with the stationary hollow member 15 communicating with the interior of the rotary pressure filter A, of any suitable type, and such, for example, as disclosed in my Patent No. 1,459,836, dated June 26, 1923, which may be equipped with any suitable internal structure, including that disclosed in my Patent No. 1,470,463, dated October 9, 1923. This filter is particularly suitable for working under the conditions defined herein for it is practical to build the filter in great lengths as from 12 feet to 30 feet or even 60 feet in length and to operate under high pressures as from 100 pounds to 200 pounds per square inch. In the example illustrated, the filter comprises the rotating cylindrical steel shell 16, Figs. 1, 2 and 3, which may be either enclosed in heat insulating material 17 or steam jacketed for maintaining within the filter suitably high temperature, as for the heavier or more viscous oils, such as cylinder stocks. The shell is supported upon four friction rollers 18, two of which are secured upon the shaft 19 and two upon the shaft 19$^a$. Upon one of the shafts, as 19$^a$, is secured the pulley or sprocket wheel 20 driven by a belt or sprocket chain 21 driven through a variable speed transmission by any suitable motor or source of power, not shown. Upon each of the shafts 19 and 19$^a$ is secured a pulley or sprocket wheel 22 connected by the belt or sprocket chain 23, whereby both shafts 19 and 19$^a$ are caused to rotate in unison.

Within the filter drum or chamber 16 is a filter member 24, of any suitable material as finely woven metallic screen serving as a filter surface upon which the earth or clay will accumulate or build up. The member 24 is spaced or separated from the inner wall of the drum 16 by the drainage plate 25 or the like, permitting the filtrate to drain to the left end of the filter structure and thence outwardly through pipe 26 communicating with the expansion joint 75, Fig. 1. Extending through the member 15 and through the interior of the filter chamber 16 is the shaft 27, driven by pulley 28 and carrying and driving the helical conveyor structure 29 coacting with the adjacent embracing trough 30 terminating at its right end, Fig. 2, at 31 within the stationary member 15. Within the chamber 16 are provided the earth-lifting members or shelves 32.

Pivoted at 33 to the chamber 15 is the closure member or door 34, adapted to be held or clamped to the chamber 15 to effect a pressure-tight joint therewith.

The pipe 26, communicating as aforesaid with the filtrate drainage space or passage of the filter A, connects through pipe 35, Fig. 1, controlled by valve 36, with the interior of the mixing tank M. The pipe 26 communicates also through the valves 26ᵃ and 37 with the interior of the cooler or heat exchange apparatus K, whose outlet is controlled by the valve 38 and communicates with the pipe 39. The cooler K may be of any suitable type, as a Griscom Russell cooler, the cooling water or medium for which may be introduced through a pipe 40 and discharged through a pipe 41. For by-passing the cooler K, as when the oil is filtered cold, as in the case of oil of low viscosity, there may be provided the pipe 42 controlled by valve 43 connecting the pipes 26 and 39. N, N¹ and N² are tanks for containing the naphtha or equivalent solvent or diluent, delivered thereto from the pipe 39 through the valves 44, 45, 46. The pipe 39 may deliver also through the valves 47 and 48 to the tank O for the purified or decolorized oil, and to tank S, into which is discharged the steam or its condensate and accompanying oil.

A pipe 49, controlled by valve 50, delivers the oil to be treated, purified or decolorized to the suction of the pump P, whose discharge delivers through the pipe 51 controlled by valve 52 to the connection between the mixing tank M and the chamber 15. With the same connection communicate the pipes 53, 54 and 55, communicating, respectively, with sources of steam under pressure, compressed air of relatively low pressure and compressed air of relatively high pressure. The pipe 53 is controlled by valve 56 and pipe 55 by valve 57. 58 is an automatic check valve in the pipe 54, preventing passage of fluid to or toward the source of low pressure air.

Assuming the system has been operating upon a batch of oil and the run has been finished, there is in the rotary filter A, built up upon the filter surface 24, the fine mesh earth or clay having a radial depth, for example, of 18 to 24 inches, more or less. The soakage oil in the earth at this stage is of the same quality as the filtered oil of the batch of which it is the last portion. Upon closure of the valve 26ᵃ and opening of valve 36, untreated oil is delivered under pressure by the pump P from the pipe 49 through valve 52 and through the chamber 15 into the rotating filter chamber A, where it passes outwardly through the fine mesh earth, displacing the soakage oil and forcing it through the pipe 35 into the mixing tank M, where it is retained by the closed valve 14, the untreated oil taking the same path to the tank M until the desired quantity has been introduced. After closure of valve 52, all of the excess untreated oil delivered to the rotating filter chamber A is forced out to the mixing tank M by opening the valve 57, which admits high pressure air, as of 50 to 150 pounds pressure per square inch, into the chamber A, forcing the last of the oil through the earth. The passage of the oil through the earth in the chamber A preliminarily treats or decolorizes it by utilizing remaining decolorizing power of the clay or earth and thereby greatly decreases the amount of new clay required to be added to the oil in the mixing tank M.

After the air blowing of the earth or clay as aforesaid, it is subjected to successive washes by naphtha, or equivalent, forced under high pressure, for example, 150 pounds to the square inch for the first wash and 50 pounds for the last wash, through the earth or clay in the rotating filter A by pump P, whose suction is now connected, after closure of valve 50, through pipe 59 with the pipe 60, communicating through valves 61 and 62 with the naphtha tanks N¹ and N². For the first washing the valve 61 is opened, valve 62 closed, and naphtha from the tank N¹ delivered by the pump P through the rotary filter A, the naphtha passing through the earth or clay still held in position, while rotating, upon the surface 24 by pressure within the chamber A, pressure for this purpose being always maintained in the chamber A, by the low pressure air delivered through the check valve 58. The air pressure for this purpose may be of the order of 5 to 15 pounds per square inch, and is always automatically applied through the check valve 58 in case the pressure within the chamber A is cut off or discontinued, as by discontinuing connection with any of the other sources of pressure, as steam, air, etc. The naphtha passes through the rotating earth, washing it, and is delivered through the pipe 26, valve 26ᵃ, and either by-pass 42 or cooler K to the pipe 39, and is delivered into the naphtha tank N, from which accumulations of naphtha may be discharged through the pipe 63, controlled by valve 64, to a still or any other suitable destination. The naphtha for the second wash is drawn from the tank N², upon closure of valve 61 and opening of valve 62, passes through the rotating earth and thence to the pipe 39, through either by-pass 42 or cooler K, to the tank N¹ valve 44 having been previously closed. The naphtha for the final washing is fresh or clean naphtha delivered through the pipe 65, controlled by the valve 66, through the pipe 59 to the pump P, which delivers it under pressure to the chamber A, where it passes through the rotating earth, and is finally discharged into the tank N².

After the naphtha washing steam, as of 50 to 150 pounds pressure per square inch, and superheated if the clay or earth is of a nature tending to slime when in contact with moisture, is delivered through pipe 53 into the chamber A and is passed through the earth or clay while rotating, the naphtha soakage being thereby carried off and passed either through the cooler K or by-pass 42 and delivered to the tank S, where the oil and water will separate, the water being drawn off through pipe 69 controlled by valve 70, and thereafter the oil drawn off through pipe 67 controlled by valve 68 to still or other destination.

After the steam is turned off by closing valve 56, the pressure in the chamber A will fall and eventually will be that of the low pressure air supplied through the check valve 58. The door or valve 34 of the chamber 15 is now opened, reducing the pressure in the chamber A to substantially atmospheric pressure, whereupon the earth will no longer remain in position upon the filter surface 24, but will collapse and fall, and the continued rotation of the chamber A causes it to be directed by the lifting shelves 32 into the trough 30, through which it is transported by the conveyor 29 into the chamber 15, from which it falls by gravity through the chute 71, which can be raised to connect to chamber 15, to the earth storage bin 2.

During the time occupied by washing, steaming and discharging the earth from filter A, old or new earth or clay, newly burned, calcined or roasted in the furnace F, is delivered, preferably at suitably elevated temperature, in dry condition, and before it can again absorb moisture, to the weighing hopper 6, from which it is discharged in suitable quantity into the oil in the mixing tank M. If the oil is heavy, as cylinder stock, its viscosity may be reduced by raising its temperature before admission to the tank M or while in the tank M, as by the steam jacket 11. The clay and oil are then thoroughly agitated for a few minutes, or until the filter A is ready to receive the batch. During agitation pressure upon the mixture in the tank M is preferably not employed unless the clay or earth employed is coarser than 100 mesh, and is, for example, from 60 to 100 mesh, in which case pressure may be exerted upon the mixture in the tank M by air of 50 to 150 pounds pressure admitted through the pipe 9.

My process herein ordinarily contemplates the heating of the oil to a desired higher-than-room temperature before adding the earth thereto. This preliminary step provides for a much closer mixture of the oil with the earth for various reasons. Chief among these reasons may be mentioned the driving off of the water vapor from the oil and the rendering of the oil less viscous. The mixing or filtering temperature of pale oils, if to be decolorized by ordinary untreated fuller's earth, should not be carried over 130° F. and very often not over 100° F. If a straight cylinder stock is to be filtered, it may be necessary to carry the temperature much higher in order to sufficiently reduce its viscosity for filtering purposes. In addition to this step, pressure is also employed in the mixing tank to more thoroughly combine the earth and oil where the earth is of a coarse mesh.

In any case, however, when tank M is to be discharged high pressure air is admitted through the pipe 9 into the tank M to force from it through the valve 14 to the chamber 15 and filter A the mixture of oil and earth, and while under the aforesaid pressure with the chamber A rotating, the oil and earth separate, the treated or decolorized oil passing through the pipe 26 and through cooler K or by-pass 42 to the pipe 39, from which it is delivered through valve 47 into the tank O, from which the decolorized or treated oil is drawn off to storage through pipe 72 controlled by valve 73. As the drum A rotates at suitable speed, as for example, one revolution per minute, the earth builds up thicker and thicker upon the filter surface 24, and may attain a thickness from about 18 inches to about 24 or even greater, the high pressure exerted within the chamber A forcing the oil through the earth, which, because of its fineness, offers great resistance to the passage of the oil, therefore requiring high pressure. The fine mesh earth or clay is quick settling, and by rotation of the filter A is uniformly built up upon the surface 24 within the shell 16 until the chamber is almost completely filled with a homogeneous cake or mass of earth having an open core at its center. The operation described prevents all possibility of channeling in the earth and facilitates the other operations of air-blowing, naphtha washing and steaming, and permits those operations to be accomplished thoroughly and at great speed under high pressure.

While the chamber A rotates at a relatively slow speed, as aforesaid, during filtering, washing and steaming operations, it may, and preferably is, driven at higher speed, as for example, ten revolutions per minute, during the time that the earth is discharged from the filter A by the conveyor 29.

After the oil has all passed off to tank O, the cycle of operations may be repeated.

In accordance with my invention as hereinbefore described, granular fuller's earth or equivalent which has been exhausted and finally discarded after repeated use upon oil or other material, in accordance with old practice, may be ground up or pulverized, sent to the furnace F and then employed in accordance with my hereinbefore described process to effect decolorization or purification of further quantities of oil. Such earth may then be treated and revivified and further used in accordance with my process.

The fuller's earth or equivalent may be revivified or otherwise improved by passing through it, for example while still in the filter chamber A, dilute mineral acid, as dilute sulphuric or hydrochloric acid, for removing coloring matter adsorbed from the oil by the earth or for otherwise improving the earth, or benzol, alcohol, acetone, or a mixture of them, or any other suitable extracting solvent, may be passed through the earth, preferably while still in the chamber A, for similarly removing coloring matter or improving the earth. Or the earth may receive treatment of both acid and benzol or alcohol, etc., in succession. Such material or materials may be delivered by pump P and pipe 51 into the chamber A, from which it may be discharged through the pipe 26 and led to suitable receptacle, or receptacles, not shown.

For the sake of brevity in the appended claims, the term "earth" includes fuller's earth and equivalents.

What I claim is:

1. The method which comprises mixing hydrocarbon oil with finely divided adsorbent earth, thereafter rotating the mixture with peripheral removal of oil while under pressure to progressively build up a layer of earth from which the oil separates by passing therethrough, removing the soakage oil from the earth layer while in rotation, thereafter roasting the earth, and while still at elevated temperature bringing the earth into mixture with a fresh quantity of oil.

2. The method which comprises rotating an earth-retaining surface, bringing a mixture of oil and earth into contact with said surface while under pressure with peripheral removal of oil to effect collection of the adsorbent earth upon said surface and passage of the oil through the earth, thereafter passing fresh quantity of oil through said earth to displace soakage oil therein, removing said earth from said surface, mixing said fresh quantity of oil with a different mass of finely divided earth, and bringing said second mixture into contact with said rotating surface to effect separation of the oil from said second mixture.

3. The method which comprises mixing oil with finely divided adsorbent earth, rotating an earth-retaining surface with peripheral removal of oil, bringing said mixture into contact with said surface to effect separation of the oil from the earth by building up an earth layer upon said rotating surface and passage of the oil through the earth layer, thereafter passing through the earth layer while in rotation a second fluid under pressure to replace soakage oil, and maintaining a pressure upon said rotating earth layer until application of said second fluid under pressure to prevent collapse of said earth layer.

4. The method which comprises mixing oil with finely divided adsorbent earth, rotating an earth-retaining surface with peripheral removal of oil, bringing said mixture into contact with said surface to effect separation of the oil from the earth by building up an earth layer upon said rotating surface and passage of the oil through the earth layer, thereafter passing fluids under pressure in succession through said earth layer, and maintaining said earth layer under pressure between the termination of the application of one of said fluids and the initiation of application of a second of said fluids.

In testimony whereof I have hereunto affixed my signature this 15th day of June, 1922.

FRED W. MANNING.